Nov. 15, 1927.　　　　　E. H. VAN VALKENBERG　　　　　1,649,046
REAR ALIGHTING GEAR
Filed Oct. 23, 1926
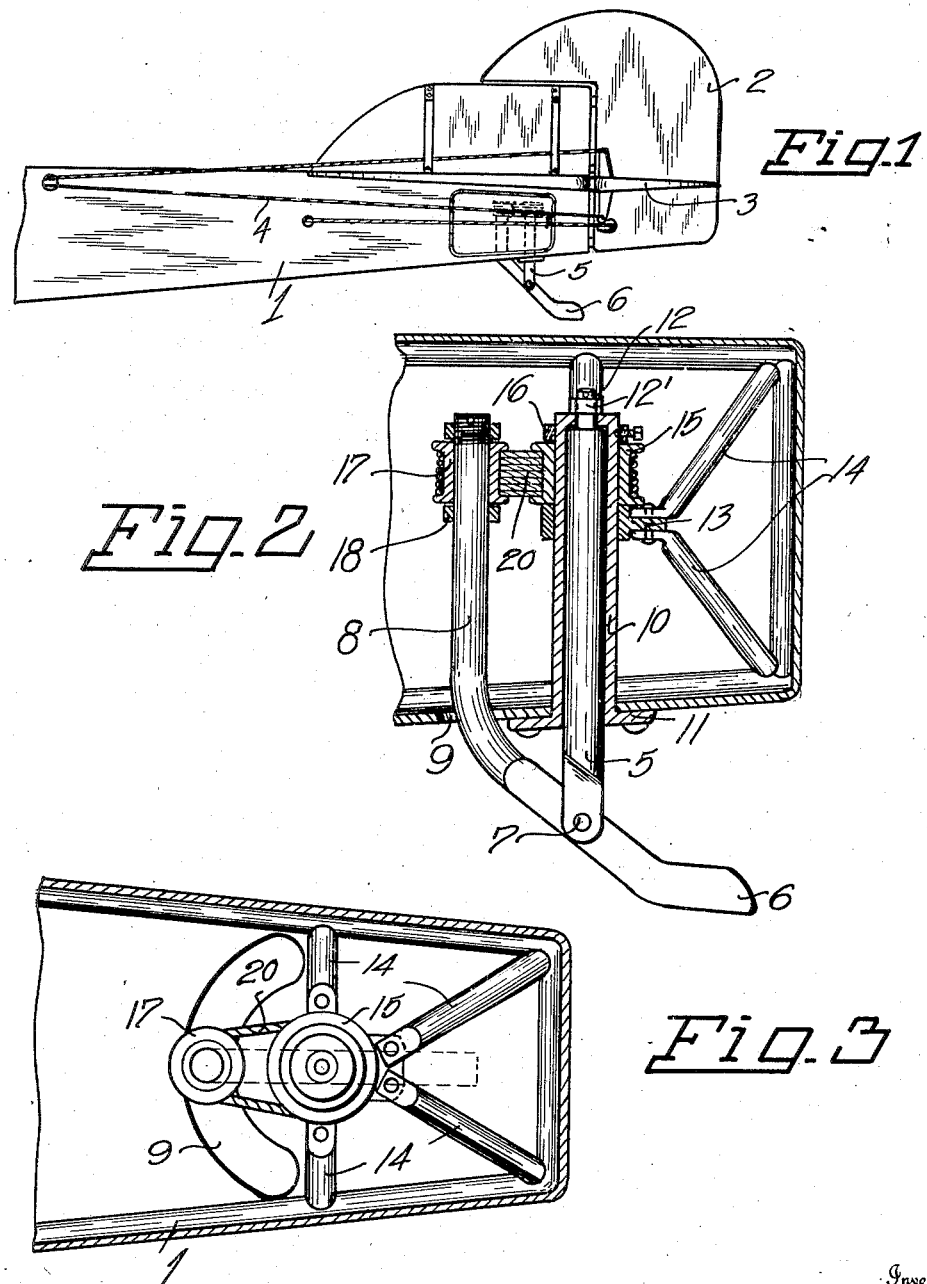
Inventor
Eber H. Van Valkenberg
Herbert E. Smith
By　　　　　　　　　　　　　　　　Attorney Patented Nov. 15, 1927.

1,649,046

UNITED STATES PATENT OFFICE.

EBER HARLEY VAN VALKENBERG, OF McKEESPORT, PENNSYLVANIA, ASSIGNOR OF ONE-HALF TO OSCAR SILVERSTEIN, OF SPOKANE, WASHINGTON.

REAR ALIGHTING GEAR.

Application filed October 23, 1926. Serial No. 143,624.

My present invention relates to an improved rear alighting gear or tail skid for use as an accessory on flying machines, and adapted to provide a flexible device at the rear end of the machine for absorbing excessive shocks occasioned when the machine is landed.

The alighting gear is also adapted for use as a swivelled tail skid on the ground to support the tail of the flying machine, thus eliminating necessity for lifting the tail of the machine when the latter is being shifted from one position to another.

The invention contemplates the use of a flexible alighting gear including a skid runner located below the tail of the aeroplane and having a swivelled support within the body or fuselage of the machine, together with shock absorbing means for the alighting gear, as will be hereinafter more fully pointed out and claimed.

In the accompanying drawings, I have illustrated one complete example of the physical embodiment of my machine wherein the parts are combined and arranged according to the best mode I have thus far devised for the practical application of the principles of my invention.

Figure 1 is a view in side elevation at the rear of a flying machine equipped with the alighting gear of my invention;

Fig. 2 is an enlarged vertical sectional view at the rear end and longitudinally of the body of the machine, showing the appliance; and Fig. 3 is a top plan view of the appliance and showing also the body of the machine in horizontal section.

In Figure 1, I have illustrated the tail portion of an aeroplane or flying machine and indicated several of the parts thereof such as 1 for the fuselage or body, 2 the vertical rotor, 3 an elevator, and 4 the control cables. The flying machine may be equipped with any suitable type of landing gear or running gear at its forward end, and the rear alighting gear of my invention is designed for use with the front or forward landing gear or running gear, especially when the tail of the flying machine contacts by excessive friction with the ground in landing the machine.

The alighting gear includes a swivelled post 5 arranged in vertical position at the longitudinal center of the fuselage or body, and adjacent to the rear end of the machine. This swivelled post supports a skid or runner 6 which is pivoted at 7 to the lower end of the post exterior of and below the body of the machine. The skid or runner 6 is provided with an angular arm 8 which extends upwardly through an arcuate slot 9 in the bottom of the body of the machine and within the body of the machine, is located substantially parallel with the swivelled post.

The post is swivelled in a tubular bearing 10 which is fashioned with an exterior attaching flange 11 bolted or otherwise secured to the fuselage. The upper end of the tubular bearing is perforated to accommodate a stud bolt 12 on the end of the post 5, and a nut 12' is used to retain the post in its tubular bearing or housing 10. It will be understood that the swivelled post 5 may turn on its axis in the tubular bearing 10, and the arm 8 and skid runner 6 swing with the swivelled post.

The tubular bearing 10 is provided with a brace ring 13 which encircles it, and a number of braces 14 are connected at suitable points to this ring and radiate to and are rigidly connected with parts of the fuselage, for the purpose of maintaining the tubular bearing in stable position.

On the tubular bearing 10 a pulley 15 is journaled above the brace ring 13, and a retaining collar 16 is secured on the tubular bearing above the pulley. A complementary pulley 17 is journaled near the upper end of the arm 8 adjacent to the pulley 15. A fixed collar 18 below the pulley 17 and a threaded collar 19 above the pulley hold the pulley 17 in position to rotate on the arm 8. Around these two pulleys a cable (or cables) 20 is wound or warped to provide a resilient shock absorbing device.

It will be apparent that when the machine is alighting and the skid or runner 6 encounters the ground surface, the weight of the tail end of the machine will be supported by the skid or runner. If the load is excessive, the weight imposed at the pivot point 7 will tend to swing the arm 8 away from the swivelled post. A limited swinging movement is permitted, and this movement is taken up by the cable 20 in coaction with the two pulley wheels 15 and 17.

When the machine is on the ground and the skid or runner 6 is supporting the tail end, it will be apparent that the tail end of the machine may be swung to right or left and the swivelled skid or runner with its arm 8 may be used as a support. As the tail end of the machine is swung, the arm 8 will travel toward either end of the arcuate slot 9 in the bottom of the body of the machine, and in this manner the machine may be shifted with facility while on the ground, without necessity for lifting its tail end.

Having thus fully described my invention, what I claim as new and desire to secure by Letters Patent, is:—

1. In an alighting gear for flying machines the combination with a tubular bearing head and a post swivelled therein, of a skid pivoted at the lower end of the post, an arm rigid with the skid and extending up in proximity to said post, a pulley on the bearing head and a complementary pulley on the arm, and a shock absorbing cable encircling said pulleys.

2. A rear alighting gear for flying machines comprising a tubular bearing head, a brace ring thereon and braces supporting said ring, a post swivelled in said tubular bearing head, a skid pivoted at the lower end of the post and provided with an integral arm parallel with the post, a pulley journaled on the tubular head and a complementary pulley journaled on said arm, and a shock absorbing cable encircling said pulleys.

In testimony whereof I affix my signature.

EBER HARLEY VAN VALKENBERG.